Jan. 2, 1923.

L. J. CRITELLI.
COMBINED AUTOMOBILE BUMPER AND FENDER.
FILED MAR. 27, 1922.

1,440,720.

INVENTOR.
LOUIS J. CRITELLI.
By. Fetherstonhaugh & Co.
Attys.

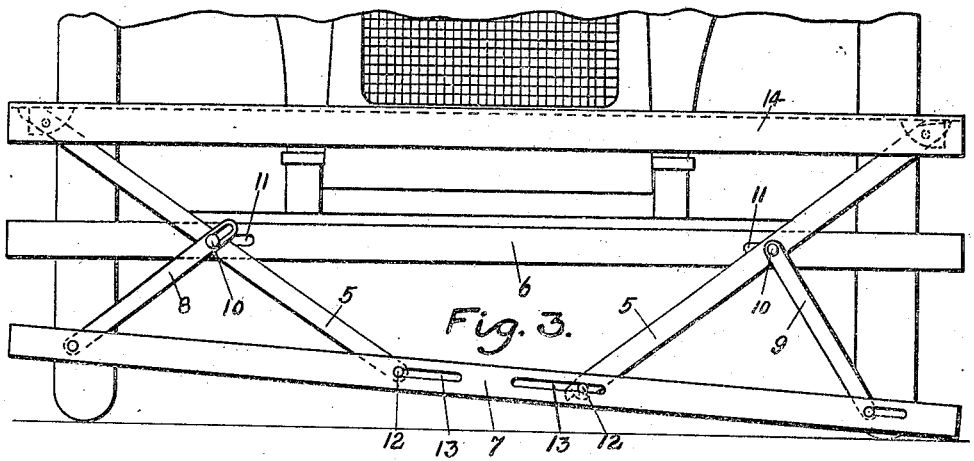
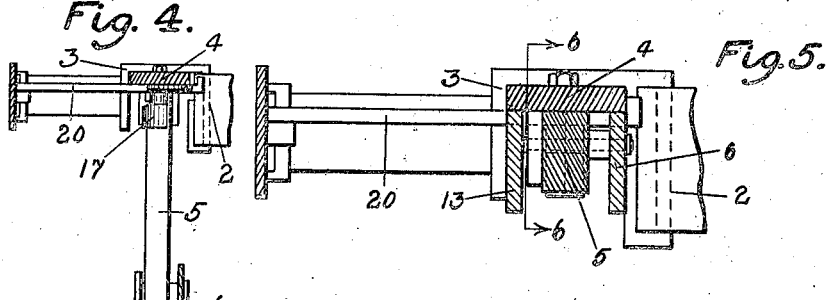
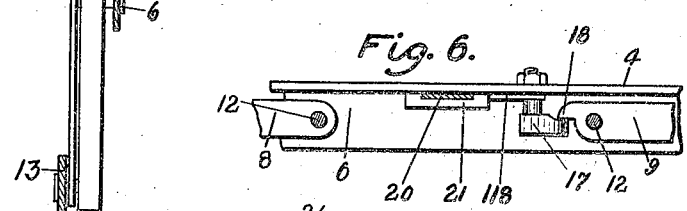
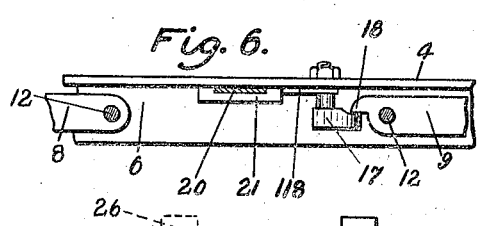
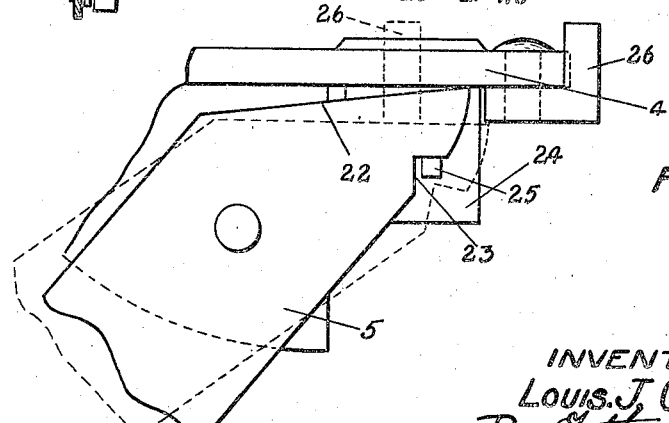

Patented Jan. 2, 1923.

1,440,720

UNITED STATES PATENT OFFICE.

LOUIS JAMES CRITELLI, OF THOROLD, ONTARIO, CANADA.

COMBINED AUTOMOBILE BUMPER AND FENDER.

Application filed March 27, 1922. Serial No. 547,079.

*To all whom it may concern:*

Be it known that I, LOUIS JAMES CRITELLI, a citizen of the United States of America, and a resident of the town of Thorold, in the county of Welland, in the Province of Ontario, Canada, have invented certain new and useful Improvements in Combined Automobile Bumpers and Fenders, of which the following is the specification.

My invention relates to improvements in combined automobile bumpers and fenders and the object of the invention is to devise a fender situated on the front of the car which will be automatically actuated into its operative or open position by the bumper.

A further object is to devise a fender which can be locked in the open position with one side lower than the other so that it will engage the road and act as a theft alarm should the car be moved.

My invention consists of a combined bumper and fender constructed and arranged all as hereinafter more particularly described, and illustrated in the accompanying drawings in which:

Fig. 3 is a similar elevation to Figure 1 showing the fender in the open position with one side locked down lower than the other side to act as a theft alarm should the car be moved.

Fig. 4 is a cross sectional view of my device showing the same in the open position.

Fig. 5 is an enlarged cross sectional view showing the same in the closed position.

Fig. 6 is a sectional view through the line 6—6 Figure 5, and

Fig. 7 is an elevational detail of one end of the fender housing showing the means for locking one of the diagonal members of the fender in its lowermost position whereby one side of the bottom bar of the fender engages the ground.

Like characters of reference indicate corresponding parts in the different views.

Figure 1:
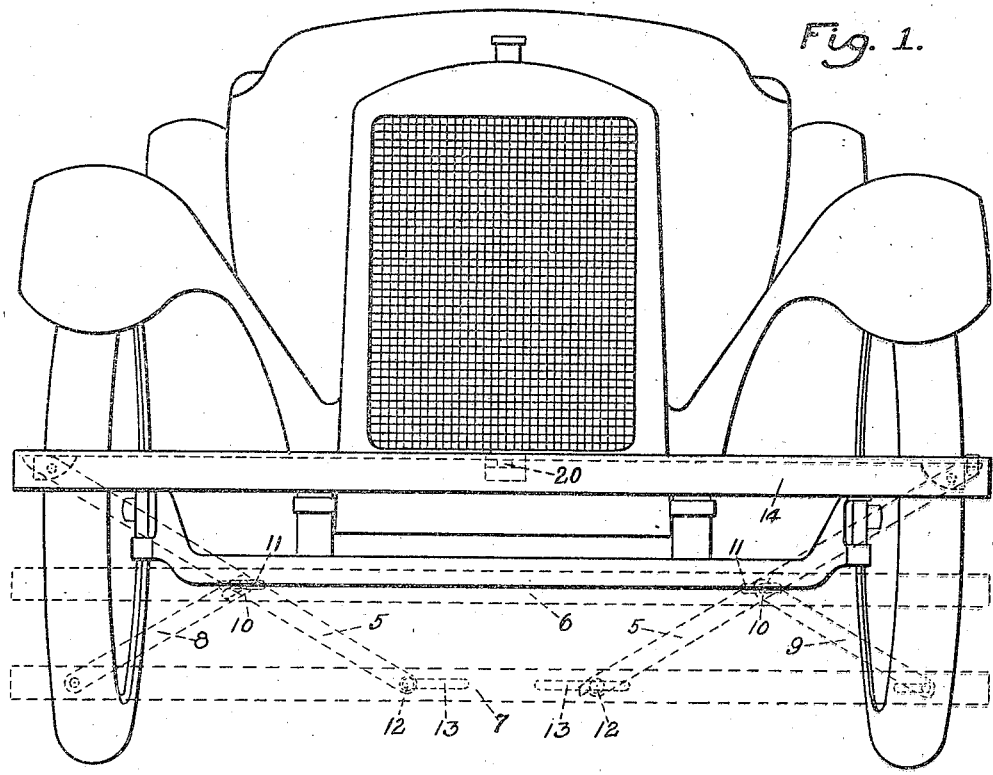
Fig. 1 represents a front elevation of a car showing my device applied thereto, the same being in the closed position in full lines and in the open position in dotted lines.

1 are the side members of the chassis frame. 2 are brackets suitably secured at their rear ends to the side members of the chassis frame and 3 are socket members secured to the laterally disposed horizontal member 4 constituting a portion of the fender housing. 5 are inwardly extending members hinged to the underneath side of the horizontal member 4. 6 is a transverse intermediate member and 7 is a transverse lower member.

8 and 9 are links, the link 8 being pivotally connected in the vicinity of one end of the member 7 and slidably connected to the corresponding member 5 intermediately of the length of the same. The link 9 is pivotally connected to the other member 5 intermediately of the length of the same and slidably connected to the lower transverse member 7. The intermediate member 6 is slidably connected to the members 5 intermediately of the length of the same.

The bolts 10 which extend through the links 8 and 9, through the respective members 5 and through slots 11 in the intermediate member 6 constitute the means for connecting the links 8 and 9 and intermediate member 6 to the respective members 5. The lower ends of the members 5 are slidably connected to the transverse member 7, by means of the bolts 12 on the ends of the members 5 being inserted through slots 13 in such member 7.

14 is the bumper member adapted to be situated in front of the fender when in the closed position and connected to the socket members 3 by means of the leaf springs 15, said leaf springs being preferably rigidly secured to the socket members 3 and slidably mounted in sockets 16 on the rear face of the bumper member 14. 17 is a swingable pawl journaled on the member 4 and positioned underneath the same, said pawl adapted to engage the hooked lower end 18 of one member 5. The pawl 17 has an arm 118 extending laterally, the free end adapted to be normally situated in a recess 19 in the rearwardly extending slide 20 connected to the bumper member at its forward end. Said slide 20 extends freely through a socket 21 on the underneath side of the member 4.

Referring to Figure 7, one member 5 is provided with an inclined upper end 22 and also with a notch 23 on the outer side thereof in the vicinity of such upper end. 24 is the casing of a lock extending downwardly through the member 4, said lock having a bolt 25 extending laterally therefrom. 26 is a pivoted stop secured to the end of the member 4.

Figure 2:
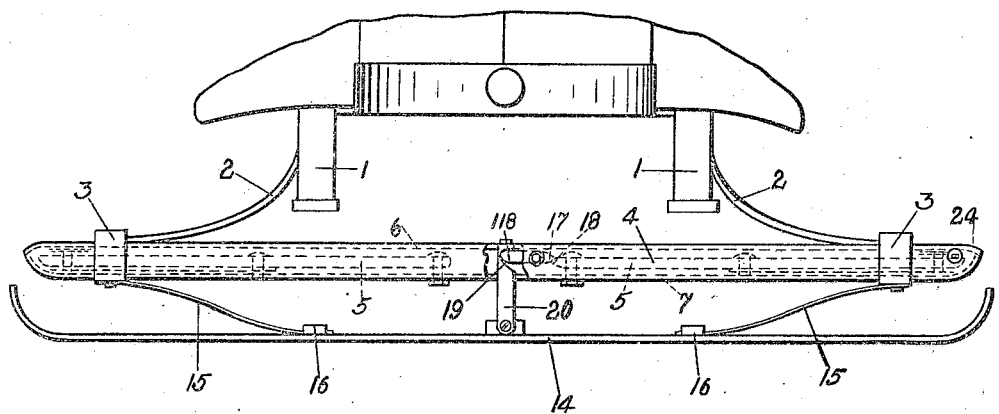
Fig. 2 is a plan view of the forward end of the car showing my device applied thereto.

The operation of my device is as follows:

Assuming that the fender is in the closed position illustrated in Figures 1, 2 and 5 should anything come in contact with the bumper member 14 such bumper member will be forced rearwardly relatively to the fender and consequently the forward face of the recess in the slide 20 will turn the arm 118 and the pawl 17 until such pawl is out of engagement with the hook 18 on the end of one member 5. When this occurs the fender will drop by gravity into the position illustrated in dotted lines in Figure 1, consequently preventing any one getting under the wheels of the car.

To replace the fender in the closed position it is merely necessary to press up the lower transverse member 7 until the pawl 17 engages the hooked end 18 of one member 5, when such fender will be locked in the closed position.

It is to be understood that when the fender is in the closed position, the intermediate transverse member 6 and the lower transverse member 7 engage the underneath sides of the members 4 and consequently constituting the rear and front portions of a fender housing of which the member 4 is the top.

In order that the fender will act as a theft alarm the one end is pressed down to its full extent wherein the inclined upper end of the corresponding member engages the underneath face of the member 4. The lock 24 is now locked so that the bolt 25 will enter the notch 23 and thus prevent this end of the fender coming up out of contact with the ground.

When such locking device is not in use the stop 26 is swung into the position illustrated in dotted lines in Figure 7 wherein it will engage the inclined upper end of the particular member 5 as illustrated in dotted lines in Figure 7, thus preventing such member from coming into engagement with the underneath side of the member 4. The position illustrated in dotted lines in Figure 7 is the position that the particular member 5 will normally assume when the fender is in its open position illustrated in dotted lines in Figure 1, whereas the position that the member 5 takes up as shown in full lines in Figure 7 corresponds with the position the fender takes up as illustrated in Figure 3.

From the above description it will be seen that I have devised a simple and effective fender which will operate automatically upon the bumper being struck and which will in addition, act as a theft alarm when desired, it being understood that the fender must be dropped into its open position in order that the theft alarm will function.

What I claim as my invention is.

1. In an automobile fender, a transverse fender supporting member suitably secured to the front of the automobile, intermediate and lower transverse fender members, inwardly extending members hinged to the transverse supporting member at their upper ends and slidably connected to the intermediate and lower transverse fender members, and links, each pivotally connected at one end to the lower transverse fender member and at the other end to the correspondingly hinged member intermediately of its length.

2. In an automobile fender, a transverse fender supporting member suitably secured to the front of the automobile, intermediate and lower transverse fender members, inwardly extending members hinged to the transverse supporting member at their upper ends and slidably connected to the intermediate and lower transverse fender members, links, each pivotally connected at one end to the lower transverse fender member and at the other end to the corresponding hinged member intermediately of its length, the intermediate and lower transverse fender members positioned respectively in rear and in front of the hinged members and constituting the back and front of a fender housing upon the fender being closed up.

3. In a combined automobile bumper and fender, a transverse fender supporting member suitably secured to the front of the automobile, intermediate and lower transverse fender members, inwardly extending members hinged to the transverse supporting member at their upper ends and slidably connected to the intermediate and lower transverse fender members, links, each pivotally connected at one end to the lower transverse fender member and at the other end to the corresponding hinged member intermediately of its length, a resiliently supported bumper member and means for automatically releasing the fender upon the bumper being forced rearwardly due to impact.

4. In a combined automobile bumper and fender, a transverse fender supporting member suitably secured to the front of the automobile, intermediate and lower transverse fender members, inwardly extending members hinged to the transverse supporting member at their upper ends and slidably connected to the intermediate and lower transverse fender members, links, each pivotally connected at one end to the lower transverse fender member and at the other end to the corresponding hinged member intermediately of its length, a resiliently supported bumper member, a hooked inner end on one of the hinged members, means on the transverse supporting members for engaging said hooked end upon the fender being closed, and means controlled by the rearward movement of the bumper due to impact for releasing the engaging means.

5. In a combined automobile bumper and fender, a transverse fender supporting member suitably secured to the front of the automobile, intermediate and lower transverse fender members, inwardly extending members hinged to the transverse supporting member at their upper ends and slidably connected to the intermediate and lower transverse fender members, links, each pivotally connected at one end to the lower transverse fender member and at the other end to the corresponding hinged member intermediately of its length, a resiliently supported bumper member, a hooked inner end on one of the hinged members, a rearwardly extending recessed slide on the bumper member, a pawl journalled to the transverse supporting member and having an arm, the free end of the arm inserted into the recess in the slide.

6. In an automobile fender, the combination with an extendible gate, of means for depressing one side of the gate into engagement with the ground when extended and relatively lower than the other side of the gate which is clear of the ground and locking means on the gate for holding such depressed side in the ground engaging position.

7. In an automobile fender, a transverse fender supporting member suitably secured to the front of the automobile, intermediate and lower transverse fender members, inwardly extending members hinged to the transverse supporting member at their upper ends and slidably connected to the intermediate and lower transverse fender members, links, one pivotally connected at the lower end to the lower transverse fender member and at the upper end slidably connected to the correspondingly hinged member and the other link pivotally connected at its upper end to the other hinged member, and slidably connected at its lower end to the lower transverse member and coacting means between the transverse supporting member and one of the hinged members for permitting the depression of the corresponding side of the lower fender member into engagement with the ground.

8. In an automobile fender, a transverse fender supporting member suitably secured to the front of the automobile, intermediate and lower transverse fender members, inwardly extending members hinged to the transverse supporting member at their upper ends and slidably connected to the intermediate and lower transverse fender members, links, one pivotally connected at the lower end to the lower transverse fender member and at the upper end slidably connected to the correspondingly hinged member and the other link pivotally connected at its upper end to the other hinged member, and slidably connected at its lower end to the lower transverse member, coacting means between the transverse supporting member and one of the hinged members for permitting the depression of the corresponding side of the lower fender member into engagement with the ground, and means for locking the lower fender member in such depressed position.

9. In an automobile fender, the combination with the transverse supporting member and one of the hinged members, having a notched upper end, of a lock on the transverse supporting member having a bolt adapted to engage the notch in the hinged member upon the lock being turned into the locked position.

10. In an automobile fender, the combination with the transverse supporting member and one of the hinged members, having a notched upper end, of a lock on the transverse supporting member having a bolt adapted to engage the notch in the hinged member upon the lock being turned into the locked position and a swingable stop on the transverse supporting member adapted to be swung over between the upper end of the hinged member and the intermediate face of the transverse supporting member.

LOUIS JAMES CRITELLI.